Figure 3:
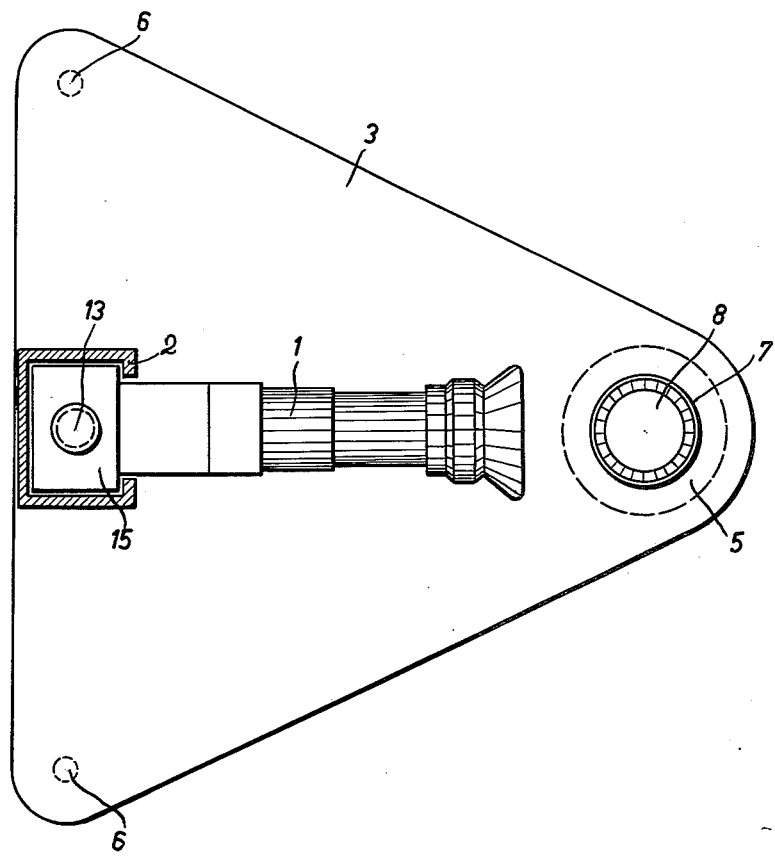

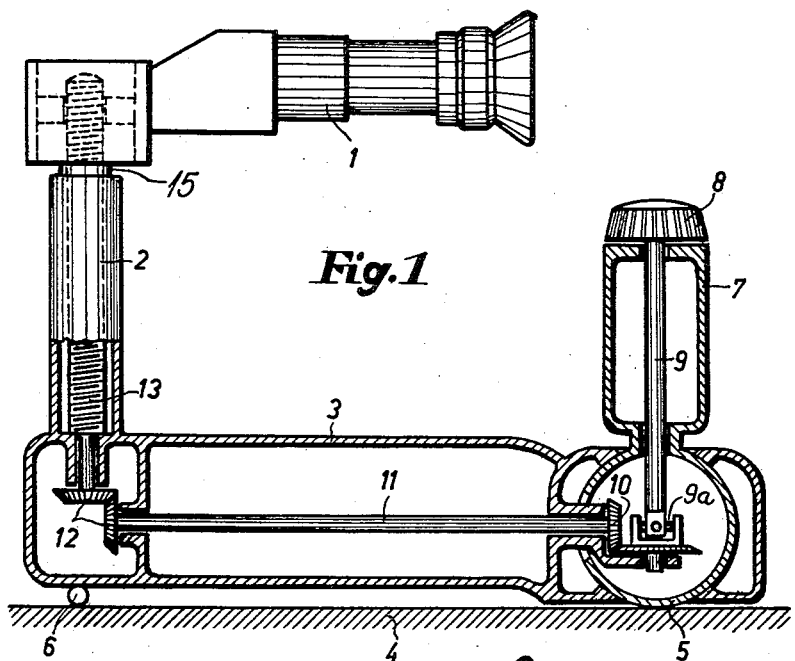
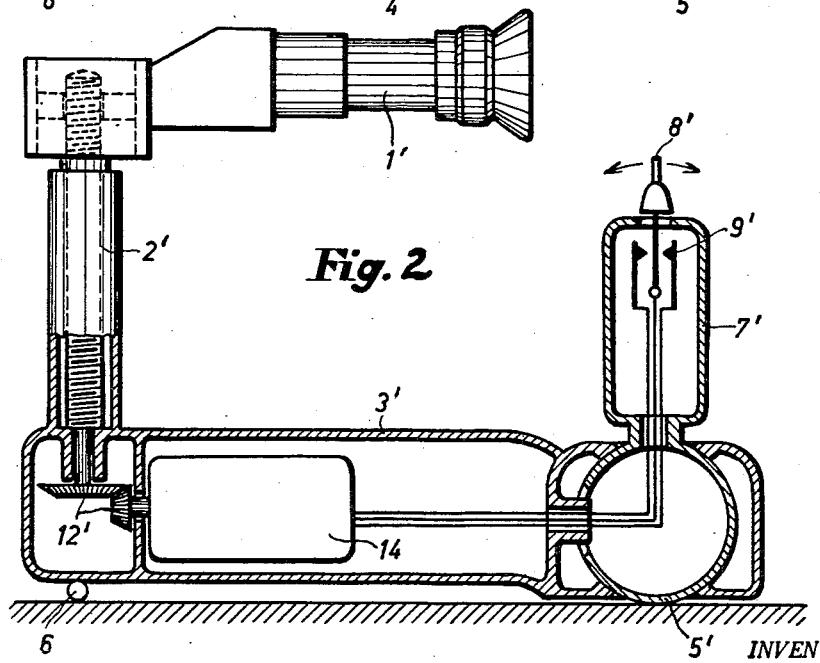

INVENTOR.
Hans Littmann

United States Patent Office 3,086,743
Patented Apr. 23, 1963

3,086,743
ADJUSTING DEVICE FOR OPTICAL
INSTRUMENTS
Hans Littmann, Heidenheim (Brenz), Germany, assignor to Carl Zeiss, Wurttemberg, Germany
Filed July 19, 1961, Ser. No. 125,230
Claims priority, application Germany July 26, 1960
4 Claims. (Cl. 248—405)

It is well known in technology and medicine to focus optical instruments by means of a control lever. Control lever arrangements commonly employed permit adjustment of the instrument in two coordinates which are independent of each other, that is in a plane, while a separate adjustment means is necessary for any movement perpendicular to said plane. As a result, in focusing the instrument with respect to an object one has either to use both hands at the same time so that no hand is free for any manipulations of the object, or one manipulates the object with one hand and is then forced to frequently change the position of the other hand so that it is not possible to continuously readjust the instrument in a direction which is not parallel to the plane of the control lever movement.

It is an object of the invention to overcome this undesirable limitation and to provide an adjusting device which permits the adjustment of an optical instrument in all of the three mutually perpendicular coordinates with one hand and at the same time. According to various methods of displacement, such as rotating a spindle manually or by a servomotor or movement by hydraulic means, the control lever is provided either with a rotatable member and means to transmit the rotation thereof to a spindle, or with an electric switch adapted to energize a servomotor for rotating a spindle or actuate electrohydraulic means, or with an actuating means for directly operating a hydraulic adjustment device.

The invention will now be described in more detail with reference to the accompanying drawings, in which:

FIG. 1 illustrates an instrument support according to the invention which is provided with mechanical transmission means, FIG. 2 illustrates another embodiment of an instrument support having electrical transmission means for the adjustment force effective in the third coordinate, and FIGURE 3 is a top elevational view partly in section showing the base and instrument supporting column.

The schematically illustrated instrument, such as a telescope or a microscope 1, includes a column 2 of rectangular cross-section supported on one end of a base 3 which is slidable with slight friction on a stationary table 4. The telescope or microscope 1 is provided with a lateral extension 15 which is slidably received in the upper end of the column 2. For this purpose, the end of the base 3 remote from the column 2 is provided with a spherical socket for movably receiving a spherical support 5 which together with two further ball supports 6 of lesser radius of curvature may form a three-point support. The displacement of the instrument in the plane of the table 4 is effected by means of an upwardly extending handle 7. The handle 7, the base 3 and the column 2 are hollow so as to accommodate the transmission means for an adjusting force effective perpendicular to the plane of the table. Within the handle 7 extends a vertical shaft 9 which is operable by a knob 8 attached outside the handle 7 to the upper end of the shaft 9. The lower end of the shaft 9 is connected via a universal joint 9a to a bevel gearing 10. The latter is connected by a horizontal shaft 11 to a further bevel gearing 12 which is operatively connected to a vertical threaded shaft 13 disposed within the column 2 and threadedly received in a correspondingly threaded opening in the end of the lateral projection. The optical instrument 1 is raised or lowered perpendicular to the table 4 depending on the direction of rotation of the threaded shaft 13.

In the embodiment illustrated in FIG. 2 the device is similar to that shown in FIGURE 1 except that the hollow handle 7' contains a selector switch 9' operable by means of an actuating lever 8' projecting from the upper end of the handle 7'. The selector switch 9' is connected by preferably flexible leads extending through the hollow spherical support 5' and through the hollow base 3' to a reversible motor 14 adapted to rotate the bevel gearing 12' in either the one or the other direction of rotation.

Both of the illustrated embodiments readily permit the adjustment of the instrument both in the plane of the table and perpendicular thereto by manipulation with only one hand.

What I claim is:

1. A supporting device adapted to be supported on a table surface for supporting optical instruments with an ocular at one end thereof and a lateral extension at the other end, comprising a hollow horizontal base having end portions, spherical surface engaging members on the underside of said base to engage said table surface, said spherical surface engaging members being arranged at the ends of said base, a hollow handle at one end of said base located adjacent said ocular, a column on the other end of said base for slidably receiving said extension, a vertical threaded shaft within said column for vertically adjusting an optical instrument at the upper end of said column, and manually operable means extending through said hollow handle and operatively connected with said threaded shaft for rotating the same.

2. A supporting device adapted to be supported on a table surface for supporting optical instruments with an ocular at one end thereof and a lateral extension at the other end, comprising a hollow horizontal base having end portions, spherical surface engaging members on the underside of said base to engage said table surface, said spherical surface engaging members being arranged at the ends of said base, a hollow handle at one end of said base located adjacent said ocular, a column on the other end of said base for slidably receiving said extension, a vertical threaded shaft within said column for vertically adjusting an optical instrument at the upper end of said column, and manually operable means extending through said hollow handle and operatively connected with said threaded shaft for rotating the same, said manually operable means including at least one bevel gearing adapted to be rotated by transmission means extending through said hollow handle.

3. A device for adjustably supporting optical instruments on a table surface with the optical instrument extending horizontally and having an ocular at one end and a lateral projection at the other end, comprising a horizontally extending and movable base having end portions, a spherical surface engaging member located at one of said end portions, a hollow handle extending upwardly from said member, a column located on the opposite end of said base for slidably receiving said projection, said hollow handle being located adjacent said ocular to permit adjustment of said instrument while the same is being scanned by an operator, a vertical threaded shaft within said column for vertically adjusting an optical instrument at the upper end of said column, and manually operable means extending through said hollow handle and operatively connected with said threaded shaft for rotating the same, said manually operable means including a manually rotatable knob at the upper end of said hollow handle, a shaft in said handle, a gearing in said means, said knob being fixedly attached to said shaft which in turn is operatively connected with said gearing, and a second gearing operatively connected with said threaded shaft and said first mentioned gearing.

4. A device for adjustably supporting optical instruments on a table surface with the optical instrument extending horizontally and having an ocular at one end and a lateral projection at the other end, comprising a horizontally extending and movable base having end portions, a spherical surface engaging member located at one of said end portions, a hollow handle extending upwardly from said member, a column located on the opposite end of said base for slidably receiving said projection, said hollow handle being located adjacent said ocular to permit adjustment of said instrument while the same is being scanned by an operator, a vertical threaded shaft within said column for vertically adjusting an optical instrument at the upper end of said column, and manually operable means extending through said hollow handle and operatively connected with said threaded shaft for rotating the same, said manually operable means including a pivotally mounted switch lever on said hollow handle, a reversible switch in said hollow handle and controllable by said switch lever, a gearing for rotating said vertical threaded shaft, and a reversible electric motor operatively connected with said gearing and electrically with said reversible switch.

References Cited in the file of this patent

UNITED STATES PATENTS

| | | |
|---|---|---|
| 1,242,110 | Koken | Oct. 2, 1917 |
| 2,512,068 | Mayo | June 20, 1950 |

FOREIGN PATENTS

| | | |
|---|---|---|
| 371,836 | Italy | June 5, 1939 |
| 617,162 | Great Britain | Feb. 2, 1949 |
| 972,101 | Germany | May 21, 1959 |
| 712,197 | Great Britain | July 21, 1959 |